May 4, 1948.  F. MASSA  2,440,903
UNDERWATER TRANSDUCER
Filed Jan. 6, 1944  3 Sheets-Sheet 1

INVENTOR.
FRANK MASSA
BY
*Eber J. Hyde*
ATTORNEY

May 4, 1948.  F. MASSA  2,440,903
UNDERWATER TRANSDUCER
Filed Jan. 6, 1944  3 Sheets-Sheet 2

INVENTOR.
FRANK MASSA
BY
ATTORNEY

May 4, 1948.　　　　　F. MASSA　　　　　2,440,903
UNDERWATER TRANSDUCER
Filed Jan. 6, 1944　　　3 Sheets-Sheet 3

INVENTOR.
FRANK MASSA
BY
Eber J. Hyde
ATTORNEY

Patented May 4, 1948

2,440,903

UNITED STATES PATENT OFFICE 2,440,903

UNDERWATER TRANSDUCER

Frank Massa, Cleveland Heights, Ohio, assignor to The Brush Development Company, Cleveland, Ohio, a corporation of Ohio Application January 6, 1944, Serial No. 517,281

15 Claims. (Cl. 177—386)

My invention pertains to underwater transducers, and more particularly to piezoelectric and magnetostrictive transducer devices adapted to function underwater either as a microphone or as a loudspeaker.

In certain naval operations a long flexible rubber "streamer" built up of a number of shorter hose sections with each section containing or including one or more transducers is utilized underwater for initiating an explosion or other action.

It is an object of my invention to provide a transducer for use in the underwater "streamer."

It is also an object of my invention to provide a transducer portions of which are molded into a rubber hose.

Another object of my invention is to provide a transducer molded into a rubber hose in such a manner that strain cords through the hose do not interfere with the operation of the transducer.

A further object of my invention is to provide an underwater transducer assembly which is also a connection means for joining two hose sections together.

It is another object of my invention to provide an enclosed microphone insert for use in a hollow rubber body.

Other objects and a fuller understanding of my invention may be had by referring to the following description and claims, taken in conjunction with the drawings, in which:

Figure 1:
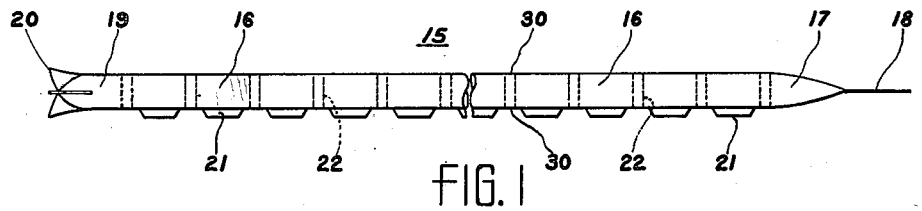
Figure 1 is a side view illustrating a streamer comprised of a number of joined hose sections.

Referring now to Figure 1, there is illustrated a "streamer" indicated generally by the reference character 15, and comprised of a number of hose sections 16 connected together and joined to a head section 17 to which a towing cable 18 is attached, and to a tail section 19 which includes fins 20 for helping to maintain the "streamer" in proper position as it is towed through water, and the "streamer" includes a plurality of hydrophone elements 22.

In Figure 1 the width dimension is exaggerated with respect to the length dimension in order that certain detail is more apparent.

In some cases it is desirable that the axis of the hydrophone element 22 be kept in a predetermined position, in which case the hose assembly may be suitably weighted with an eccentric load or keel 21, as shown, for example, in Patents 793,896 and 1,470,733. The orientation of the hydrophone axes may become necessary for the particular structure shown at the high supersonic frequencies because at these frequencies the hydrophone elements 22 would not display a nondirectional pick-up pattern.

Figure 7:
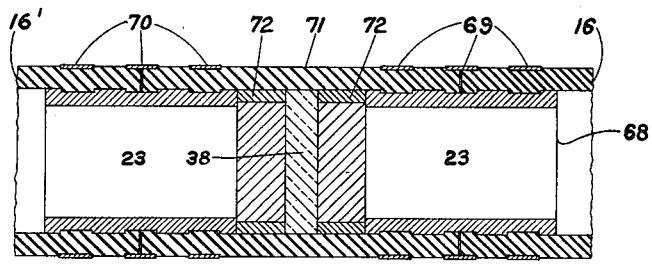
Figure 7 is a view of a longitudinal section of a modified type of transducer which also serves as a hose joint.
Figure 8:
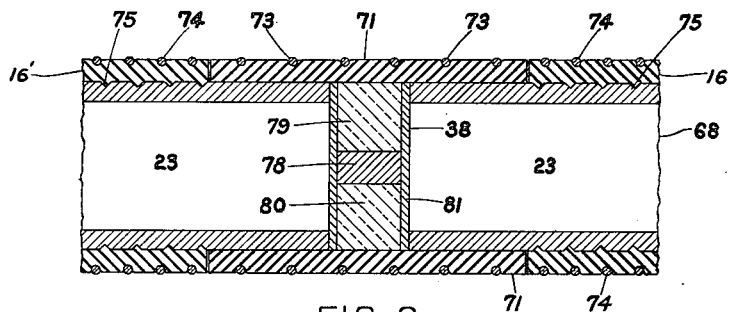
Figure 8 is a view of another modification somewhat similar to Figure 7.
Figure 9:
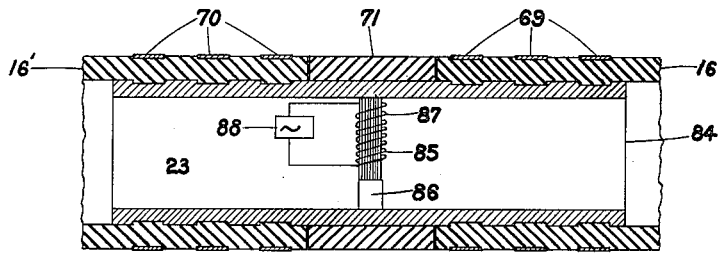
Figures 9 and 10 are views of modifications utilizing the magnetostrictive principle.

Each hose portion contains a transducer indicated generally by the reference character 22, and positioned vertically with respect to the position of the "streamer" as it is being towed, and the connection means for securing two adjacent hose sections together is indicated generally by the reference character 23 (Figures 7, 8, 9).

One of the problems in the design of the "streamer" was to provide a hollow hose several hundred feet long, as small as possible in diameter, and having sufficient strength in its walls that it could be towed through water at a fairly rapid rate without breaking in two, and that it be able to withstand pressures caused by near-by explosions without damage to its operation. The hose had to be flexible and waterproof. Therefore, rubber was a logical choice. However, rubber, in order to withstand the stresses to which it would be subjected, had to have stress cords somewhat similar to the cords in a rubber tire, and these cords prohibited the faithful transmission of sound vibrations through the hose between a transducer within the hose and the water outside of the hose. This was because of the tremendous attenuation of the vibration due to the cords, and rendered such a construction worthless.

The problem was then one of providing a "window" between the water outside of the hose and the transducer within the hose such that vibrations would be faithfully transmitted, and to so construct the "window" that the hose would not be weakened by the lack of sufficient stress cords. Further, a suitable transducer had to be designed, and the combination of the hose and transducer had to be able to withstand high pressure shocks.

Figure 2:
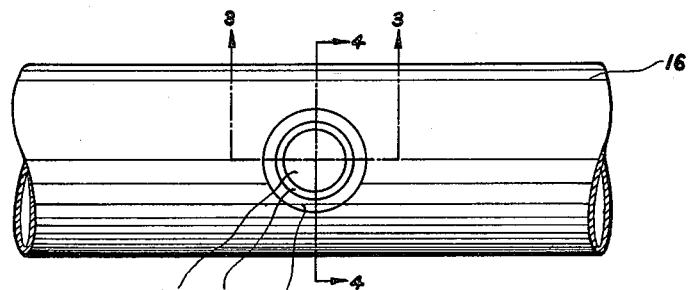
Figure 2 is a plan view of the portion of a hose section which includes a "window."

Figure 2 illustrates a portion of a hose section 16 which includes a rubber window 30 extending through the side wall into the hollow interior of the hose. This window 30 is comprised of sound transmitting rubber which has a mechanical impedance substantially equal to the mechanical impedance of water whereby sound vibrations are effectively transmitted from the water to the inside of the hose in case the hose is serving as a microphone, and from the inside of the hose to the outside water in case the device is serving as a transmitter.

Figure 3:
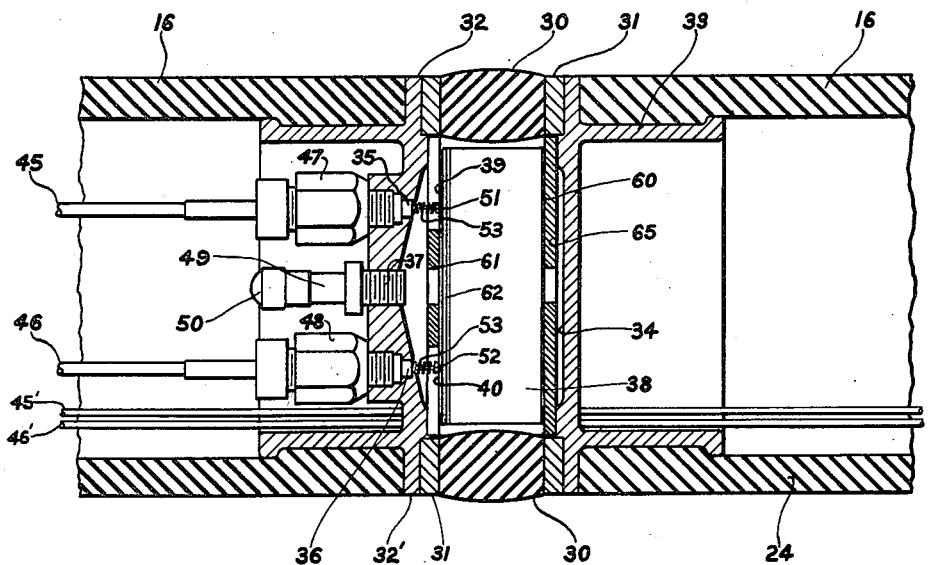
Figure 3 is a sectional view of the hose portion taken along line 3—3 of Figure 2, and showing the construction of a piezoelectric transducer within the hose.

With reference to Figure 3, there is shown a metal sleeve 33 which is mounted into the rubber hose 16. The sleeve portion 33 includes a first circular portion 32 which is integral therewith and extends through the side wall of the hose 16 terminating substantially flush with the outside surface of the hose to reduce turbulence when water flows past it; and includes a second ring portion 32' of like construction but which extends through the hose 16 opposite to the ring portion 32. The joint between the hose 16 and the ring portions 32 and 32' is waterproof to prevent the entrance of sea water into the hose. The sleeve 33 includes a hollow liquid-proof housing 34 positioned within the sleeve, which housing has three threaded openings 35, 36 and 37. Two rubber windows are provided each of which is surrounded by a heavy brass ring 31. A joint between the brass ring 31 and the rubber 30 is such that no water will pass through it. In building a transducer into the hose section 16, a sub-assembly comprised of the rubber window 30 and a ring 31 is pressed into the housing ring 32 until the bottom edge of the ring 31 is in firm engagement with the shoulder portion of the sleeve 33. Red or white lead or other such preparation may be applied to the outside surface of the brass ring 31 prior to its being pressed into the ring 32 in order to lubricate the surface and to provide a more waterproof joint. Before the other window sub-assembly is pressed into the hose, a crystal sub-assembly, indicated generally by the reference character 38, is inserted into the housing 34. The second rubber window is then pressed into its housing ring in a manner similar to the pressing of the first window sub-assembly. The crystal sub-assembly 38 is held in a holder 65, and the holder 65 has openings in its side facing the openings 35, 36, and 37 in the housing 34, to permit movable contacts connected to the housing to engage the crystal element leads.

Figure 5:
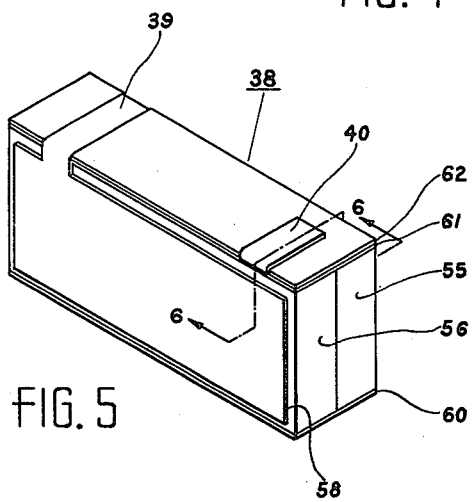
Figures 5 and 6 are views showing the detail of a piezoelectric crystal for use in the hose section.
Figure 6:
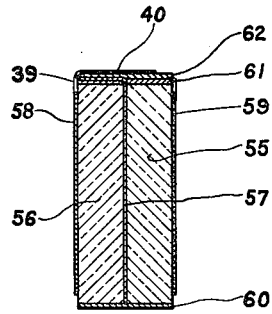

Figures 5 and 6 illustrate the details of the crystal which is used in the crystal sub-assembly 38 and includes two leads 39 and 40. When the sub-assembly 38 is positioned within the housing 34, care must be exercised that the leads 39 and 40 are on the side facing the openings 35, 36 and 37.

Lead wires 45 and 46 are next inserted into the hose 16 by means of special tools which engage the threaded nipples 47 and 48 which are connected to the lead wires 45 and 46. I have found in assembling this unit that it is convenient to only connect one lead wire to the housing at this time, say, for instance, lead wire 46 and to connect a vacuum pump to the opening 35. A valve 49 having a threaded end portion is screwed into the opening 37 and a pipe is attached to it through which oil, such as castor oil, may enter the housing 34.

The housing is evacuated before oil is permitted to enter the housing 34, and when suitable valves (not shown) are opened the partial vacuum which has been established causes oil to enter the housing. This oil is permitted to flow into the housing through the valve 49 and out through the connection to the vacuum pump until all air is removed from the housing. A section of glass tubing in the connection between the housing and the vacuum pump may be utilized so that the operator can see when all air has been removed. A sump (not shown) may be positioned in the vacuum line between the housing and the vacuum pump to collect all of the oil which flows out of the housing, and to prevent oil from affecting the operation of the vacuum pump. During this operation the hose section 16 may be turned in any direction to facilitate the removal of all of the air and assure that all of the space within the housing 34, which is not occupied by the crystal assembly 38, is filled with oil.

When air no longer remains in the housing 34 the vacuum pump is disconnected at opening 35 thereby allowing a small quantity of oil to pour into the housing through valve 49 and run out of the opening 35. While this oil is running out of the opening 35 the lead wire 45 is screwed into the opening thereby sealing it and preventing the ingress of air into the housing. The pipe to the valve 49 is then connected to a line having high air or gas pressure and a small additional amount of oil is forced into the housing thereby creating a pressure within the housing which exceeds atmospheric pressure. The pipe to the valve 49 is then removed, and valve 49 prevents the oil from being forced out of the housing. A valve cap 50 may then be screwed onto the valve 49.

The nipple 47 has a movable contact 51 mounted on a plunger and biased away from the nipple by means of a spring 53; and the nipple 48 has a movable contact 52 mounted on a plunger and biased away from the nipple by a similar spring 53. When the nipples 47, 48 and the crystal assembly 38 are in place, the contact 51 is firmly pressed against the crystal lead 39 and the contact 52 is firmly pressed against the crystal lead 40. The contact 51 is electrically connected to the lead wire 45, and the contact 52 is electrically connected to the lead wire 46.

It is not necessary that the piezoelectric crystal in the crystal sub-assembly 38 touch the rubber windows 30 as vibrations will be transmitted therebetween by the oil within the housing 34.

Crystal sub-assembly 38, as shown by Figures 5 and 6, comprises first and second expander blocks 55 and 56 of piezoelectric crystalline material connected together with an electrode 57 in between them. Outer electrodes 58 and 59 are provided and lead 39 is electrically connected to each of them while lead 40 is connected to electrode 57, as is particularly shown in Figure 6. The piezoelectric crystalline material 55 and 56, which is illustrated in my device, preferably is of the Rochelle salt type, although obviously other crystalline materials may be used. The blocks of Rochelle salt crystal 55 and 56 are 45° X-cut expander plates having the direction of desired expansion and contraction, due to an alternating potential being applied between the electrode 57 and the electrodes 58 and 59, in a direction extending parallel to the longest dimension of the block and the direction of undesired expansion and contraction normal thereto. To prevent this undesired expansion and contraction from establishing spurious signals in a generator device and to prevent it from reducing the quality of a microphone device, I provide corprene pads 60, 61 and 62 on the top and bottom faces of the crystal blocks 55 and 56. A more complete description of the reasons why this corprene is needed will be found in my patent application Serial No. 436,304, abandoned and refiled as Serial No. 669,761. The corprene pad 60 is applied to the bottom face of the slabs 55, 56 and the two corprene pads 61 and 62 are applied to the top face. Lead 40 extends from the inner electrode 57 through a slit in the corprene pad 61 and then extends around the side of the corprene pad 62 thus providing insulation between the lead 40 and the crystal block.

The corprene pads 60, 61 and 62 not only function to decouple two of the vibrating faces of the piezoelectric crystals from the surrounding oil, but also serve as cushioning means for holding the crystal blocks 55 and 56 within the holder 65 to prevent damage to the fragile crystalline material which might be occasioned by the heavy explosions which occur near-by.

The sleeve 33 which may be of steel, prevents crushing of the transducer when a near-by explosion takes place, and the remainder of the rubber hose collapses under the impact, and then resumes its original shape. Lead wires, such as 45' and 46', which run the entire length of the streamer, and which connect each of the plurality of the spaced microphones into an electrical circuit, are not harmed by the crushing of the hoses 16.

It has been found that the slightest amount of air within the hollow portion of the housing 34 will materially reduce the excellence of this transducer unit. Accordingly, it is advantageous to go to some length to assure the removal of all air from the oil prior to its being pumped into the housing 34. This is done by first thoroughly filtering the oil to remove all foreign matter and then by placing the oil in a clean jar and applying a vacuum on the order of one hundred microns to the upper surface of the oil. While the partial vacuum is on the oil, a small amount of heat is applied to the jar and mechanical agitation is applied to the oil. It is advisable to prevent the oil from boiling. With such a treatment it has been noted that air bubbles form in the oil and it is thought that some of these bubbles probably originate in impurities which are so small that they cannot be seen by the naked eye and which cannot be readily filtered out. Several hours of treatment by vacuum and heat with mechanical agitation will remove a large amount of this air from the oil. The oil is then pumped into the housing 34 without ever coming in contact with air at atmospheric pressure. It has been found that hose units filled with deaerated oil are much more uniform and excellent than hose units filled with ordinary oil, and it is believed that when ordinary oil is used there is a considerable quantity of air in it which cannot be seen, and that this air attenuates the vibrations which are transmitted through the oil.

I have shown and described how the crystal sub-assembly can be mounted in a hose section 16. It is also within the scope of my invention to join two hose sections together by means of a connection which includes a transducer such as a microphone. One such method is shown in Figure 7 wherein the end of one hose section 16 is shown spaced from the end of another hose section 16' and they are held together by means of a coupling tube 68 to which the section 16 is connected by means of bands 69 and to which the section 16' is connected by means of bands 70. A rubber tube 71 comprised of solid sound transmitting rubber is provided around the coupling tube 68 and between the sections 16 ad 16'. The rubber tube is connected to the coupling tube by means of the same bands 69, 70. Mounted across the rubber tube 71 and held in place by spacers 72 is the crystal sub-assembly 38 which can be somewhat similar to that shown in Figure 3.

Figure 8 illustrates another method of assembling a microphone in such a manner that it also comprises a joint in a rubber hose. The coupling tube 68 has two holes through its side walls into which the crystal unit 38 is mounted and a piece of sound conducting rubber 71 is wound around the coupling tube 68 and is tightly held in position by a helix of banding wire 73. The hose sections 16 and 16' may be connected to the coupling tube 68 by means of wire 74 wound in a helix, and notches 75 may be provided in the coupling tube 68 to establish a more positive grip between the tube and the hose section.

The crystal sub-assembly 38 may be comprised of a central portion 78 and two crystal portions 79 and 80 spaced one on either side of the central portion and having one face thereof in contact with the rubber tube 71 and another face in contact with the central portion. The crystals 79 and 80 are expander crystals adapted to expand and contract along the diameter of the coupling tube. Housing means 81 are provided for preventing water from contacting the crystals.

While I have shown my invention utilizing piezoelectric crystals, it is also possible to use other means such as magnetostrictive devices to achieve satisfactory results. One such magnetostrictive device is shown schematically in Figure 9 in which a coupling tube 84 is shown connected to hose sections 16 and 16' by means of steel bands 69 and 70 very similar to the construction shown in Figure 7. In this instance, however, the coupling tube 84 does not have holes through its side walls and is preferably comprised of nickel. Across the inside of the tube and on one of its diameters there is mounted an iron core 85 comprised of a plurality of laminations of a magnetizable material and at the one end thereof I position a small permanent magnet 86 which slightly magnetizes the iron core 85, which magnetism may be called a magnetic bias. Around the iron core 85 is a coil 87 which is connected to an electrical circuit 88. If the magnetostrictive device shown in Fig. 9 is operating as a microphone, the electrical circuit 88 may then comprise an amplifier and loudspeaker system, or other such well-known means for obtaining a signal; and if the magnetostrictive device shown in Figure 9 is acting as a loudspeaker or transmitting transducer, then the electrical circuit 88 may comprise any of the well-known signaling circuits including amplifiers etc.

Figure 4:
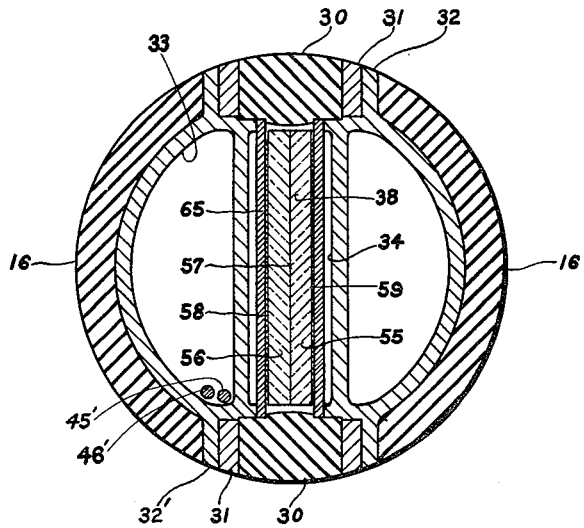
Figure 4 is a sectional view through the hose portion taken along line 4—4 of Figure 2.
Figure 10:
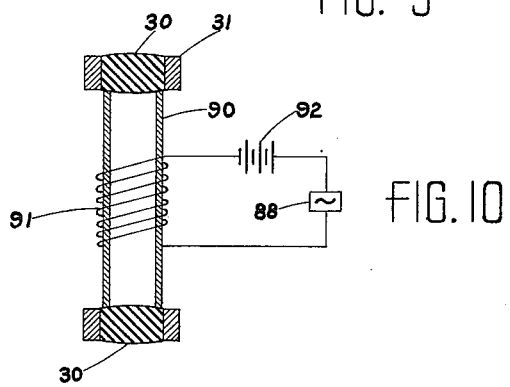

Figure 10 illustrates another magnetostrictive embodiment of my invention utilizing the rubber windows 30 which were described in detail in connection with Figures 2, 3, and 4. In this embodiment the rubber windows 30 are mounted in a rubber hose section, and extending between the two windows 30 there is a nickel tube 90. Around the nickel tube 90 is a coil 91 which is connected into an electrical circuit 88 similar to the circuit 88 in Figure 9. An important difference between the device shown in Figure 10 and that shown in Figure 9 is that instead of providing a magnetic bias by means of a small permanent magnet 86 the bias is provided by means of the battery 92 which is in series with the electrical circuit 88.

While I have described my invention with a certain degree of particularity, it is to be understood that numerous changes may be made without departing from the spirit and scope of my invention.

I claim as my invention:

1. In combination with a long flexible tube having side-walls of appreciable thickness, a plurality of vibration transmitting window means having better vibration transmitting properties than said tube spaced apart on opposite sides of said tube and extending through the side-walls thereof, and transducer means within said tube and in vibration transmitting relationship with said plurality of window means for transmitting or receiving vibrations therethrough.

2. In combination with a long flexible tube having side-walls of appreciable thickness and sealed at both ends whereby it may be immersed in water, a plurality of vibration transmitting window means having better vibration transmitting properties than said tube spaced apart on opposite sides of said tube and extending through the side-walls thereof, means for sealing the joint between the said windows and the said tube to prevent the ingress of water, transducer means within said tube and in vibration transmitting relationship with said plurality of window means for transmitting or receiving vibrations therethrough, and housing means within said tube for protecting said transducer means.

3. The combination as set forth in claim 2 further characterized in this; that said housing means and said window means together establish a liquid-proof container for said transducer means, and said container contains a liquid.

4. In combination with a long flexible tube having side-walls of appreciable thickness and with a plurality of openings therethrough, a sleeve within said tube and having a portion extending into each of said openings through the side-walls of said flexible tube, each of said extending portions having a central opening, vibration transmitting window means sealing each of said central openings in said extending portions, and transducer means within said tube and in vibration transmitting relationship with said window means, said transducer means being mounted on said sleeve.

5. In combination with a long flexible tube having side-walls of appreciable thickness and having two openings therethrough on opposite sides thereof, a rigid sleeve within said tube and having a portion extending into each of said openings through the side-walls of said flexible tube, each of said extending portions having a central opening, vibration transmitting window means sealing each of said central openings in said extending portions, and transducer means within said tube and in vibration transmitting relationship with said window means, said transducer means being mounted within said sleeve, and said sleeve and said window means together establishing a liquid-proof housing around said transducer means.

6. The combination as set forth in claim 5 further characterized in this; that said housing is filled with a vibration transmitting liquid, and said transducer means includes piezoelectric crystal means having two pair of parallel vibrating faces one pair of which is covered by vibration absorbing material.

7. In an underwater streamer comprised of a plurality of lengths of flexible tubing coupled together and sealed at the ends thereof, a connecting sleeve having two diametrically disposed wall portions adapted to transmit vibrations, means for attaching one of said plurality of lengths of tubing to one end of said sleeve, means for attaching another of said plurality of lengths of tubing to the other end of said sleeve, and transducer means mounted within and extending across from one side to the opposite side of said connecting sleeve in vibration transmitting relationship with said two diametrically disposed wall portions, said transducer means being adapted to expand and contract along a line substantially normal to the longitudinal axis of said streamer when said transducer is excited by an alternating voltage.

8. The device as set forth in claim 7 further characterized by a plurality of openings in opposite sides of said connecting sleeve through which said transducer means extends, and vibration transmitting means covering the said openings and the ends of the said transducer means for sealing the openings against the ingress of water.

9. In combination with a long flexible tube having two diametrically disposed wall portions adapted to transmit vibrations and sealed at both ends whereby it may be immersed in water, a rigid sleeve member within said flexible tube and supporting a portion of said tube throughout its circumference, said rigid sleeve member having two diametrically disposed openings adjacent said vibration transmitting portions of said tube, transducer means of the type adapted to alternately expand and contract upon the application of an alternating electric or pressure signal, and means for mounting said transducer means within said sleeve member with the end faces thereof in vibration transmitting relationship through said two sleeve openings with the diametrically disposed vibration transmitting wall portions of said flexible tube.

10. The combination as set forth in claim 9 further characterized in this, that a substantially moisture-proof housing extends across said sleeve member between said two openings therein, and said transducer means comprises piezo-electric crystal element means mounted within said substantially moisture-proof housing.

11. In combination with a long flexible tube having two diametrically disposed wall portions adapted to transmit vibrations and sealed at both ends whereby it may be immersed in water, a rigid sleeve member within said flexible tube and supporting a portion of said tube throughout its circumference, transducer means of the type adapted to alternately expand and contract upon the application of an alternating electrical or pressure signal, and means for mounting said transducer means within said sleeve member with its direction of expansion and contraction aligned with said two diametrically disposed wall portions and in vibration transmitting relationship with said two wall portions.

12. In combination with a long flexible tube having side walls, electro-mechanical transducer means adapted to expand and contract along one of its dimensions upon the suitable application of an alternating potential and conversely upon expanding and contracting along said dimension in response to a suitably applied alternating force to establish a corresponding alternating electrical signal, transducer mounting means within said tube to prevent said tube from collapsing due to externally applied pressures and to hold said transducer means with its direction of expansion and contraction diametrically across said tube, said transducer having a pair of end faces substantially perpendicular to said direction of expansion and contraction in vibration transmitting relationship with only two localized diametrically disposed portions of said tube.

13. The combination with a long flexible tube having two diametrically disposed vibration transmitting portions and sealed at both ends whereby it may be immersed in water, an electromechanical transducer means adapted to expand and contract along one of its dimensions upon the suitable application of an alternating potential and conversely upon expanding and contracting along said dimension in response to a suitably applied alternating force to establish a corresponding alternating electrical signal, and means for mounting said transducer means within said tube with the faces of said transducer which are perpendicular to said direction of expansion and contraction in effective vibration transmitting relationship with said two diametrically disposed vibration transmitting portions of said tube.

14. The combination set forth in claim 13 further characterized by said two diametrically disposed vibration transmitting portions comprising wall inserts of material having better vibration transmitting properties than said tube.

15. The combination set forth in claim 13 further characterized by said tube being comprised of a plurality of separate lengths of tube connected together, and said means for mounting said transducer comprises means for connecting together two lengths of said tube.

FRANK MASSA.

REFERENCES CITED

The following references are of record in the file of this patent:

UNITED STATES PATENTS

| Number | Name | Date |
| --- | --- | --- |
| 793,896 | Mundy | July 4, 1905 |
| 1,470,733 | Hayes | Oct. 16, 1923 |
| 1,481,923 | Nash | Jan. 29, 1924 |
| 1,486,735 | Fessenden | Mar. 11, 1924 |
| 1,584,613 | Comstock et al. | May 11, 1926 |
| 1,632,331 | Hayes | June 14, 1927 |
| 1,742,704 | Hayes | Jan. 7, 1930 |
| 2,025,041 | Colton et al. | Dec. 24, 1935 |
| 2,147,649 | Haines | Feb. 21, 1939 |
| 2,384,465 | Harrison | Sept. 11, 1945 |

FOREIGN PATENTS

| Number | Country | Date |
| --- | --- | --- |
| 304,173 | Great Britain | Feb. 14, 1929 |